(12) United States Patent
Caillot

(10) Patent No.: US 11,001,233 B2
(45) Date of Patent: May 11, 2021

(54) FLUID DISTRIBUTION VALVE FOR A VEHICLE WINDSHIELD WASHER LIQUID DISTRIBUTION SYSTEM

(71) Applicant: Valeo Systèmes d'Essuyage, Le Mesnil Saint Denis (FR)

(72) Inventor: Gérald Caillot, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 312 days.

(21) Appl. No.: 15/546,295

(22) PCT Filed: Dec. 17, 2015

(86) PCT No.: PCT/EP2015/080237
§ 371 (c)(1),
(2) Date: Jul. 26, 2017

(87) PCT Pub. No.: WO2016/119974
PCT Pub. Date: Aug. 4, 2016

(65) Prior Publication Data
US 2017/0369037 A1    Dec. 28, 2017

(30) Foreign Application Priority Data

Jan. 30, 2015 (FR) ................................. 1550729

(51) Int. Cl.
*B60S 1/48* (2006.01)
*F16K 7/12* (2006.01)
(Continued)

(52) U.S. Cl.
CPC .............. *B60S 1/482* (2013.01); *B60S 1/48* (2013.01); *B60S 1/481* (2013.01); *B60S 1/488* (2013.01);
(Continued)

(58) Field of Classification Search
CPC ........ B60S 1/522; B60S 1/524; B60S 1/3862; B60S 1/487; B60S 1/48; B60S 1/56;
(Continued)

(56) References Cited

U.S. PATENT DOCUMENTS 4,520,227 A * 5/1985 Krimmer ............... H02G 3/088
174/135
4,969,424 A 11/1990 Klomp
(Continued)

FOREIGN PATENT DOCUMENTS

DE    26 38 879 A1    3/1978
DE    19860753    * 10/1999
(Continued)

OTHER PUBLICATIONS

Machine translation of description portion of German publication 19860753, published Oct. 1999 (Year: 1999).*
(Continued)

*Primary Examiner* — Gary K. Graham
(74) *Attorney, Agent, or Firm* — Osha Bergman Watanabe & Burton LLP

(57) ABSTRACT

Fluid distribution valve (11), particularly for a vehicle screen wash system, characterized in that it comprises a body (41) defining a duct (43) for the passage of fluid and comprising at least one fluid inlet (45) and at least one fluid outlet (47, 49), a membrane (53) housed in the duct and configured to be deformed under the action of a magnetic field between a first position of at least partial closure of the duct and a second position of at least partial opening of the duct, and means (51) for generating a magnetic field within the duct in order to cause the membrane to deform.

13 Claims, 3 Drawing Sheets

(51) Int. Cl.
*F16K 31/06* (2006.01)
*F16K 7/04* (2006.01)
*B60S 1/52* (2006.01)
*F16K 27/02* (2006.01)

(52) U.S. Cl.
CPC .............. *B60S 1/524* (2013.01); *F16K 7/045* (2013.01); *F16K 7/123* (2013.01); *F16K 27/029* (2013.01); *F16K 31/0641* (2013.01); *F16K 31/0672* (2013.01)

(58) Field of Classification Search
CPC ........ B60S 1/566; B60S 1/3415; B60S 1/481; B60S 1/488; B60S 1/482; F16K 7/045; F16K 7/123; F16K 31/0641; F16K 31/0672; F16K 31/0651; F16K 31/0606; F16K 99/0046; F16K 27/029; F16K 31/06–105; A61F 9/00781; A61F 2250/0013
USPC ....... 15/250.04; 251/129.06, 129.21, 129.22, 251/129.17, 227; 137/909, 863, 315.03
See application file for complete search history.

(56) References Cited

U.S. PATENT DOCUMENTS

| | | | | |
|---|---|---|---|---|
| 5,016,312 | A * | 5/1991 | Frimley | B60S 1/4038 15/250.04 |
| 5,118,071 | A * | 6/1992 | Huelle | F16K 7/07 137/554 |
| 5,383,602 | A * | 1/1995 | Edele | B60S 1/3415 15/250.01 |
| 5,996,964 | A * | 12/1999 | Ben-Shalom | F16K 31/06 251/129.09 |
| 2004/0265150 | A1* | 12/2004 | McElfresh | F04B 43/043 417/413.1 |
| 2012/0066857 | A1* | 3/2012 | Webert | B60S 1/3862 15/250.04 |
| 2012/0272471 | A1 | 11/2012 | Schmid et al. | |

FOREIGN PATENT DOCUMENTS

| | | |
|---|---|---|
| DE | 19860753 A1 | 10/1999 |
| FR | 2777340 A1 | 10/1999 |
| FR | 2 967 954 A1 | 6/2012 |
| FR | 2994148 A1 | 2/2014 |
| JP | S50-036116 U | 4/1975 |
| JP | H02-070556 A | 3/1990 |
| JP | H09-286307 A | 11/1997 |
| JP | 2005-014787 A | 1/2005 |
| JP | 2013-514920 A | 5/2013 |
| JP | 2014-073826 A | 4/2014 |

OTHER PUBLICATIONS

Machine translation of description portion of French publication 2967954, published Jun. 2012 (Year: 2012).*
International Search Report issued in PCT/EP2015/080237 dated Mar. 14, 2016 (3 pages).
Written Opinion of the International Searching Authority issued in PCT/EP2015/080237 dated Mar. 14, 2016 (5 pages).
Communication from the Examining Division and Annex to the Communication in corresponding European Application No. 15 817 225.4, dated Jul. 29, 2019 (4 pages).
Notice of Reason for Rejection in corresponding Japanese Application No. 2017-540212, dated Aug. 30, 2019 (16 pages).

* cited by examiner

FLUID DISTRIBUTION VALVE FOR A VEHICLE WINDSHIELD WASHER LIQUID DISTRIBUTION SYSTEM

TECHNICAL FIELD

The present invention concerns a fluid distribution valve in particular for a vehicle windshield washer liquid distribution system.

PRIOR ART

There are known motor vehicle windshield wiper systems comprising windshield wipers carrying windshield washing devices, each of the wipers including one or two windshield washer liquid sprayer manifolds. In the case of a wiper including a single manifold (mono-manifold), the manifold extends on one side of the wiper to spray windshield washer liquid onto the windshield. The liquid is generally sprayed ahead of the moving wiper so as to be wiped immediately and not interfere with the driver's view. For example, the liquid is sprayed in the upward direction and spraying is stopped for the movement of the arm in the downward direction. In some applications the water can be sprayed behind the wiper, to allow the liquid time to interact with the pollutants that have to be eliminated.

The supply of windshield washer liquid to the manifold necessitates a pipe feeding the liquid to the manifold from a single-channel pump taking the windshield washer liquid from a windshield washer liquid tank disposed under the hood of the vehicle.

In the case of a wiper including two manifolds (bi-manifold), there is a manifold on each side of the wiper. These manifolds are designed to spray the windshield washer liquid onto the windshield alternately in the upward direction and the downward direction of rotation of the wiper. The supply of windshield washer liquid to these manifolds necessitates two separate pipes feeding the liquid to the manifolds from a two-channel pump taking up liquid from the tank. However, installing these two pipes as far as the sprayer manifolds is relatively complicated, in particular at the level of the wiper drive arms along which the available interior space is small.

Also, the two visible pipes on the arm are often perceived as relatively unaesthetic, there being also a requirement to improve the visual appearance of the liquid supply arrangement.

The two pipes also have a negative impact on aerodynamic performance.

To alleviate these drawbacks wiper systems have already been proposed in which the two sprayer manifolds are connected to a single pipe enabling said manifolds to be fed from a single-channel pump. The windshield washer liquid is distributed into one and/or the other of said sprayer manifolds by at least one valve directing the windshield washer liquid into the selected sprayer manifold or manifolds.

The invention aims in particular to improve this technology by means of a new type of valve that makes it possible for example to distribute the windshield washer liquid from a single-channel pump to one or two (or even more) sprayer manifolds.

However, this new type of pump is not limited to this particular application and can be used in any application necessitating distribution of fluid.

SUMMARY OF THE INVENTION

To this end the invention proposes a fluid distribution valve, in particular for a vehicle windshield washer liquid distribution system, characterized in that it comprises a body defining a duct for the passage of fluid and including at least one fluid inlet and at least one fluid outlet, a membrane housed in the duct and configured to be deformed by a magnetic field between a first position of at least partial closure of the duct and a second position of at least partial opening of the duct, and means for generating a magnetic field inside the duct in order to control the deformation of the membrane. The valve according to the invention is therefore controlled by means of a magnetic field, the application of that magnetic field inducing a movement of the membrane. This technology advantageous makes it possible to circumvent the mechanical constraints.

In the present application, at least partial closure (respectively opening) of the duct means the closure (respectively opening) of at least one inlet or outlet of the duct. The membrane can be configured to block at least part of the duct, in particular at least one outlet of the duct, in its first position, corresponding to the absence of an applied magnetic field. In this first position, the membrane can have a profile of non-plane shape.

On application of the magnetic field, the membrane is deformed and adopts a position in accordance with the field lines termed the second position. In this second position the membrane can be at least in part pressed against an internal wall of the duct. It can have a profile of substantially plane shape in this second position. The membrane is preferably made from a flexible material and is for example made from a polymer material, notably from silicone.

According to one embodiment of the invention, this membrane contains magnetic particles. When acted on by the magnetic field generated by said means the magnetic particles are able to deform the membrane. The application of the magnetic field can therefore lead to deformation of the membrane and opening or closing of the duct. To be more precise, the particles carried by the membrane will become aligned with the field lines on application of the magnetic field and will lead to the deformation of the membrane and its movement from one position to another.

The membrane may be fixed to an internal wall of the duct.

The means for generating the magnetic field preferably comprise a winding of at least one electrical wire around the part of the duct housing the membrane. This winding forms a coil—or solenoid—that is intended to be connected to a power supply. The valve according to the invention can therefore be considered a solenoid valve. It is the flow of current in the winding that induces a magnetic field.

This winding can be configured to generate heat for heating the fluid. This is advantageous if there is a risk of the fluid freezing.

The valve can be integrated into a fluid pipe. Alternatively the valve is connected to a pipe of this kind. For example, the fluid inlet includes a connector for connecting it to the feed pipe coming from the pump and/or the fluid outlet includes a connector for connecting it to a sprayer manifold. In the context of the invention, by sprayer manifold is meant any vehicle windshield washer liquid sprayer device known to a person skilled in the art, and the sprayer manifold includes a plurality of sprayer nozzles, for example. In a variant the manifold is a simple nozzle.

According to another aspect, the present invention consists in a hydraulic connector for a vehicle windshield washer liquid distribution system comprising at least one valve according to the invention.

According to a further aspect, the present invention consists in a vehicle windshield washer liquid distribution system comprising at least one valve as described above.

The present invention also concerns a vehicle windshield wiper system comprising at least one valve as described above.

That system may comprise a pump, for example a single-channel pump, at least one wiper and at least one sprayer manifold connected to the pump by said valve. The latter is situated on the wiper, for example.

In the case of a mono-manifold wiper the valve has an inlet connected to the pump and an outlet connected to the manifold and is termed a two-port valve. In the case of a bi-manifold wiper the valve is of the three-port type and has an inlet connected to the pump and two outlets connected to respective manifolds.

The valve may be integrated into means for connecting the wiper to a drive arm of said wiper. Alternatively, the valve is integrated into an end fitting of the wiper.

In one embodiment the wiper system also comprises a wiper drive arm on which the sprayer manifold is situated, for example.

In another variant it can be mounted under the hood of the vehicle equipped with the wiper system.

In a further variant, the valve is used to feed nozzles or manifolds integrated into a wiper arm and functions on the same principle to control spraying.

The present invention also concerns a system for cleaning a motor vehicle driver assistance device, in particular imaging means or electromagnetic detection means, said system comprising at least one fluid distribution valve according to any of the above definitions. By "imaging means" is meant for example a video camera and by "electromagnetic detection means" is meant for example radar or lidar means. Sensors are fitted to an increasingly large number of motor vehicles in order to assist the driver of the vehicle in certain driving situations, one well known instance of which is assisting parking. For this assistance to be as effective as possible, the images supplied by the imaging means or the data transmitted by the radar, for example, must be of the best possible quality and it is therefore essential for the faces of these sensors facing toward the exterior of the vehicle to be clean. To this end, a device for cleaning the sensor may be associated with the sensor and controlled so as to inject a flow of cleaning fluid onto said sensor before detection occurs. It is beneficial to control the device to determine the start and the duration of the cleaning sequence and if necessary to be able to retract the cleaning device after use, in order for it not to impede detection when the sensors are operating, and in order to protect them from impacts, for example. Moreover, it must be as compact as possible to satisfy constraints on the overall size of the vehicle. It is moreover a requirement that such devices enable the injection of different fluids, whether gases or liquids. In fact, if a cleaning liquid is sprayed onto the sensor, for example the lens of an imaging video camera, to expel dirt from it, it is beneficial to dry that lens quickly in order to prevent any risk of pollution of the images by any traces that such a liquid may leave behind (droplets, streaks, etc.). Equipping a driving assistance device of this kind with a cleaning system of this kind comprising a valve according to the invention is therefore particularly advantageous, the latter valve being compact and if necessary controllable directly by a magnetic field generated by an electric current for supplying power to said driver assistance device. This avoids the requirement for additional means to control the valve according to the invention.

The present invention further concerns a vehicle, in particular a motor vehicle, characterized in that it comprises at least one valve or one system as described above.

The present invention further concerns a method of controlling a fluid distribution valve, in particular for a vehicle windshield wiper system, characterized in that it comprises a step of generating a magnetic field inside a duct of the valve in order to move a membrane housed in said duct from a first position of at least partial closure of the duct to a second position of at least partial opening of the duct.

DESCRIPTION OF THE FIGURES

The invention will be better understood and other details, features and advantages of the invention will become apparent on reading the following description given by way of nonlimiting example and with reference to the appended drawings, in which.

DETAILED DESCRIPTION

In the remainder of the description the terms longitudinal and lateral refer to the orientation of the drive arm on which the wiper is mounted. The longitudinal direction corresponds to the main axis of the arm along which it extends and the lateral orientations correspond to straight line segments that are concurrent, i.e. that cross the longitudinal direction, notably perpendicularly to the longitudinal axis of the arm in its plane of rotation. For the longitudinal directions, the terms front and rear are to be understood relative to the point at which the wiper is fixed to the arm, the term front designating the direction from the distal end of the arm and the term rear the opposite direction. Moreover, the directions referred to as upper or lower correspond to orientations perpendicular to the plane of rotation of the arm, the term lower containing the plane of the windshield.

Finally, identical reference numbers are used to designate identical or analogous elements.

Figure 1:
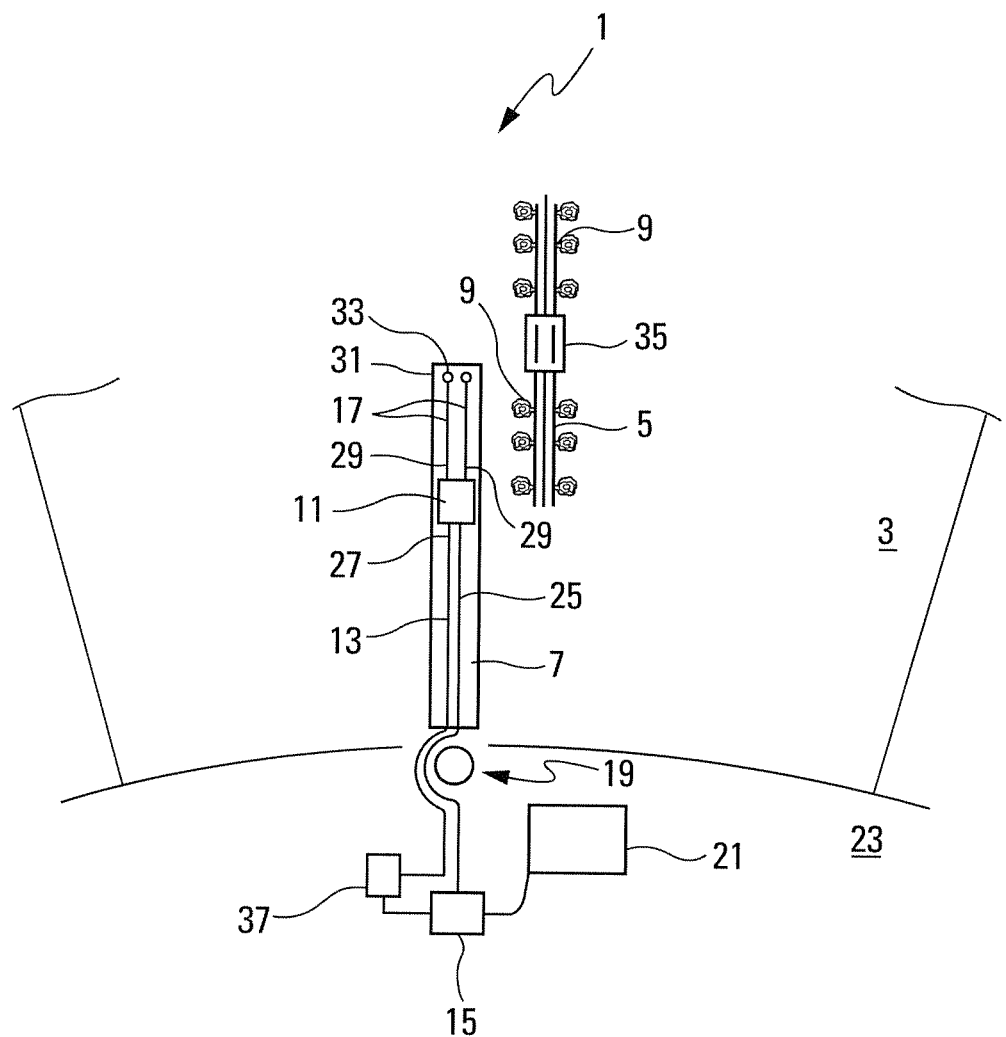
FIG. 1 is a diagram showing a vehicle windshield wiper system.

Refer first to FIG. 1, which shows a system 1 for wiping the windshield 3 of a motor vehicle, that system here including a bi-manifold wiper 5 for wiping the windshield 3 that is shown detached from a drive arm 7. The wiper 5 includes two windshield washer liquid sprayer manifolds 9 mounted on the wiper.

The wiper system 1 further comprises windshield washer liquid supply means that comprise a valve 11 according to the invention for selective distribution of windshield washer liquid to each of the manifolds 9, a windshield washer liquid feed pump 15 and a feed pipe for feeding the windshield washer liquid from the pump 15 to the valve 11. The valve 11 is connected to the manifolds 9 by two pipes 17.

In the example shown, the wiper system 1 includes a single wiper 5 disposed substantially at the center of the windshield 3. The wiper system 1 could alternatively include two wipers, one disposed facing the driver and one disposed facing the passenger.

The manifolds 9 extend substantially over the length of the wiper, on each side and on its longitudinal axis. These manifolds 9 are therefore adapted to spray the windshield washer liquid along the wiper.

The wiper 5 is mounted on the drive arm 7 so that it can be driven by the latter to wipe the windshield 3 with a cyclic rotation movement over the windshield substantially in part of a circle about a rotation axis 19.

The pump 15 for feeding the manifolds 9 with windshield washer liquid is itself connected to the valve 11 by means of the feed pipe 13, which here is a flexible pipe, and to a windshield washer liquid container 21 from which the liquid is taken to be fed to the manifolds 9.

The feed pipe 13 and an electrical power supply cable 25 of the valve 11, preferably connected to the pipe 13, are for example housed at least in part in the arm 7 and in part under the hood 23 of the vehicle.

The valve 11 according to the invention can be mounted at the distal end 31 of the arm 7, for example at the level of an arm headpiece.

Figure 2:
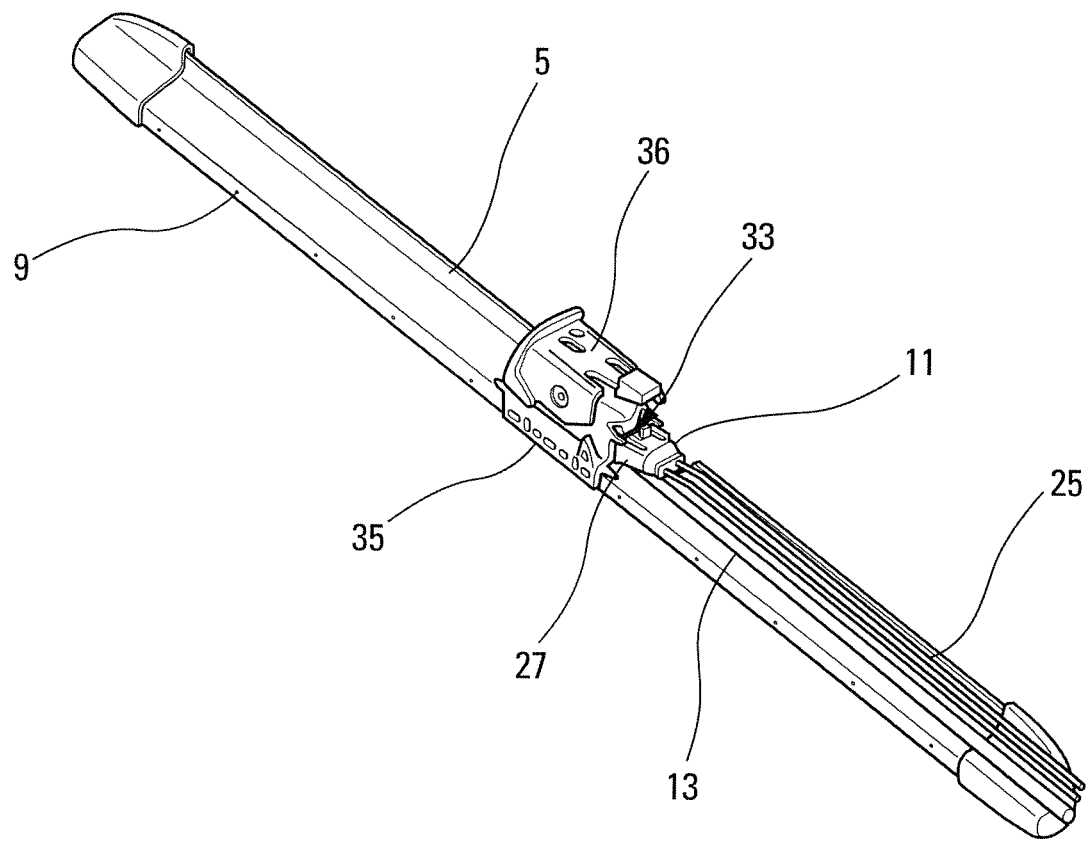
FIG. 2 is a perspective view of a wiper of a vehicle windshield wiper system.

The valve 11 is preferably at least in part integrated into a hydraulic connector 33 configured to establish a hydraulic connection of the valve 11 to the manifolds 9, as seen in FIG. 2, so that at least its two outlets are configured to form part of the hydraulic connector intended to be connected to the wiper.

The hydraulic connector 33 is disposed on the arm 7, not shown in FIG. 2. Here the wiper 5 further includes a mechanical connector 35 and an adapter 36 articulated to the mechanical connector and configured to be locked onto the arm 7.

The valve 11 and the pump 15 are connected to a control unit 37 which is for example the body controller of the vehicle, forming means for combined control of the valve and the pump.

This control unit 37 can manage the operation of the valve 11 and the pump 15 in accordance with a plurality of distinct operating modes. One of those modes can provide in a cleaning cycle continuous activation of the pump 15 and selective control of the valve 11 as a function of the various positions of the wiper 5 on the windshield 3 in an associated wiping cycle.

Figure 3:
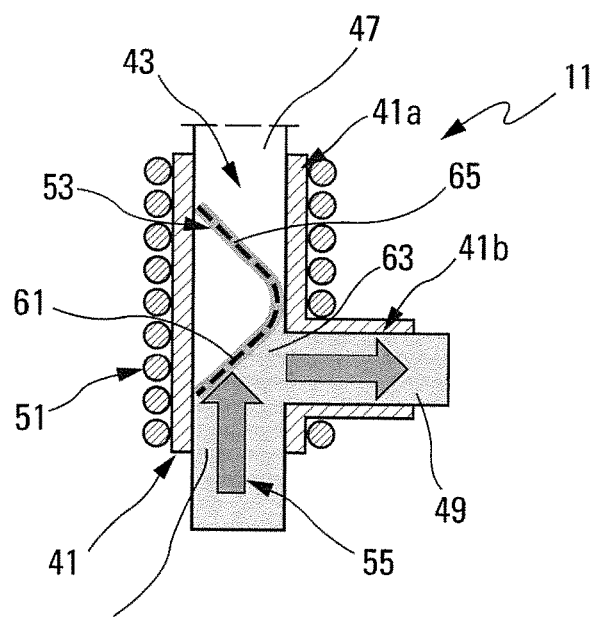
FIGS. 3 and 4 are diagrams showing in axial section two different positions of a valve according to the invention for a bi-manifold wiper.
Figure 4:
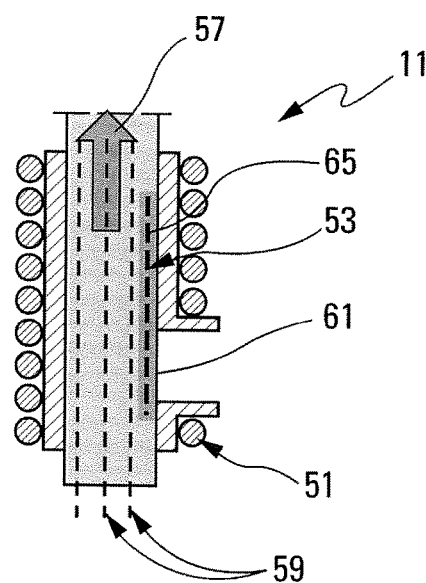

Refer next to FIGS. 3 and 4, which are diagrams showing a first embodiment of the valve 11 according to the invention.

The valve 11 comprises a body 41 defining a duct 43 for the windshield washer liquid and here including an inlet 45 and two outlets 47, 49. The first outlet 47 is for example aligned with the inlet and the second outlet 49 is lateral and here is substantially perpendicular to the inlet 45, the duct 43 therefore being substantially T-shaped. As explained above, the inlet 45 of the valve is connected by the pipe 13 to the pump 15 and the outlets 47, 49 of the valve are connected to the respective pipes 17.

The body 41 comprises a main part 41a defining the inlet 45 and the first outlet 47 and a branch 41b that defines the second outlet 49. The main part 41a of the body is surrounded by a winding 51 consisting of electrical wire(s) that forms a coil or solenoid and is connected to a power supply, not shown, via the power supply cable 25 of the control unit 37. This winding 51 can take the form of one or more layers of electrical wire on the part 41a of the body. Alternatively, the winding 51 can be integrated into the body 41 of the valve so as to extend around the duct 43 over a part of its length. The valve 11 further comprises a membrane 53 mobile between a first position of at least partial closure of the duct 43 (FIG. 3) and a second position of at least partial opening of the duct (FIG. 4).

The T-shape of the duct of a three-channel valve is not limiting on the invention. The inlet and the two outlets can therefore form a Y or any other shape appropriate to the shape of the mobile membrane and to the integration of the valve into the system.

In the example shown, when the membrane 53 in its first position (FIG. 3) it blocks the first outlet 47 of the duct and leaves its second outlet 49 free. When the pump 15 is activated the windshield washer liquid flows from the inlet 45 to the second outlet 49 of the valve to feed windshield washer liquid to one of the manifolds 9 of the wiper 5 (arrow 55).

When the membrane 53 is in its second position it blocks the second outlet 49 of the duct and leaves its first outlet 47 free. When the pump 15 is activated the windshield washer liquid flows from the inlet 45 toward the first outlet 47 of the valve to supply windshield washer liquid to the other manifold 9 of the wiper 5 as shown by the arrow 57.

The membrane 53 is deformed between the first and second positions by application of a magnetic field in the duct 43 and in particular in the part of the duct housing the membrane.

Here the membrane 53 is housed in the main part 41a of the duct. Here, in the absence of an applied magnetic field, the membrane 53 is in the first position shown in FIG. 3. Immediately on application of a magnetic field induced by the supply of electrical power to the winding 51 the membrane 53 is deformed and adopts the second position shown in FIG. 4.

To this end the membrane 53 is made from a supple or flexible material (such as a polymer material) and contains magnetic particles that are intended, when acted on by the magnetic field, to deform the membrane and to move it from its first position to its second position. Upon application of the magnetic field the particles carried by the membrane are aligned parallel to the field lines 59, which deforms the membrane 53.

In the example shown, the membrane 53 is fixed substantially at its center to the internal wall of the main part 41a of the body. It comprises an upstream part 61 (in relation to the direction of flow of the liquid in the duct 43) that can be deformed between a position in which it is applied to the peripheral edge of the mouth 63 of the second outlet 49 in the duct and therefore blocks that outlet 49 (FIG. 4) and a position in which its free end contacts an internal surface of the duct 43 situated facing the mouth 63 and therefore blocks the first outlet 47 (FIG. 3).

The membrane 53 also comprises a downstream part 65 that can be deformed between a position in which it is applied to an internal surface of the duct 43 situated on the same side as the mouth 63 and therefore leaves the first outlet 47 free (FIG. 4) and a position in which its free end contacts an internal surface of the duct situated on the side opposite the mouth 63 and therefore blocks the first outlet 47 (FIG. 3).

In its position represented in FIG. 3 the membrane 53 has the shape of a U or a V with a median part fixed to the internal wall of the duct 43 and the branches of which form the aforementioned upstream part 61 and downstream part 65, respectively. In the position shown in FIG. 4 the membrane 53 has a substantially plane shape.

The general shape of the membrane 53 depends in particular on the shape in section of the duct 43. When the duct 43 has a square shape in section the membrane 53 can have a rectangular general shape. The membrane 53 can then be designed to be pressed against a plane internal face of the duct 43 in FIG. 4 and its upstream part 61 and downstream part 65 can each be configured so that its peripheral edges cooperate in fluid-tight manner with the other internal faces of the duct in FIG. 3.

When the duct 43 has a circular shape in section the upstream part 61 and the downstream part 65 of the membrane 53 can each have a circular or oblong general shape.

The wiper system 1 and the valve 11 from FIGS. 3 and 4 can operate in the following manner. When the wiper 5 must be fed with windshield washer liquid the control unit 37 activates the pump 15, which feeds the valve with windshield washer liquid from the container 21. The winding 51 of the valve 11 can at this stage remain unenergized so that the membrane 53 remains in the first position shown in FIG. 3, in which case the windshield washer liquid feeds the manifold of the wiper connected to the second outlet 49, for example during rotation of the wiper in the upward direction. The control unit 37 then activates the valve 11, i.e. activates the supply of electrical power to the winding 51. The membrane 53 is then moved into the second position shown in FIG. 4 so that the windshield washer liquid flows to the manifold of the wiper connected to the first outlet 47, for example during rotation of the wiper in the downward direction.

Figure 5:
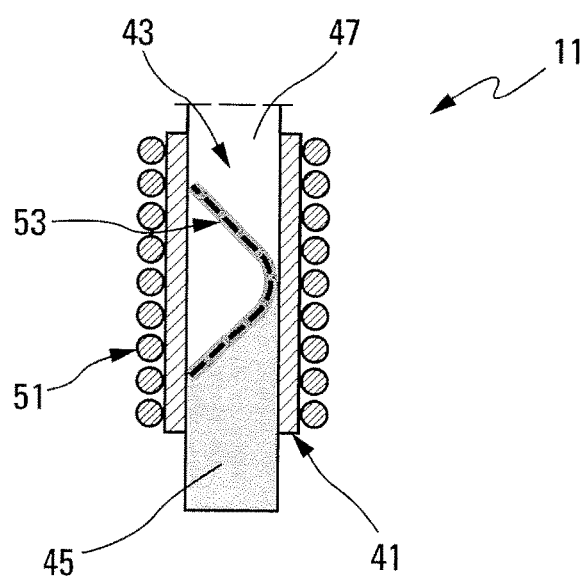
FIGS. 5 and 6 are diagrams in axial section similar to FIGS. 3 and 4 and showing a variant embodiment of the valve according to the invention for a mono-manifold wiper.
Figure 6:
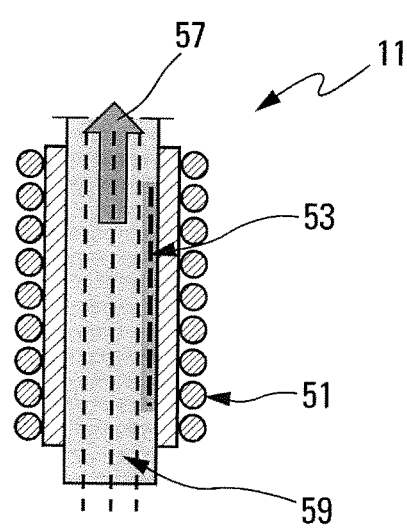

FIGS. 5 and 6 show a variant embodiment of the valve according to the invention, this valve 11 including an inlet 45 and only one outlet 47 and therefore being of the two-port type, which can be used to feed washer liquid to a mono-manifold wiper. The references used in relation to FIGS. 3 and 4 are used again to designate the same elements in FIGS. 5 and 6.

The essential structural difference between the embodiments of FIGS. 3 and 4 on the one hand and FIGS. 5 and 6 on the other hand is that the body 41 of the valve does not include a branch. In its first position shown in FIG. 5, the membrane 53 completely blocks the duct 43 and in its second position shown in FIG. 6 it leaves the duct 43 free.

The control unit 37 can command simultaneous activation of the pump 15 and the valve 11 from FIGS. 5 and 6, windshield washer liquid then flowing from the container 21 to the single manifold of the wiper via the duct 43 of the valve 11. The invention is not limited to the examples that have just been described.

The invention claimed is:

1. A fluid distribution valve for a vehicle windshield washer liquid distribution system, comprising:
   a body defining a duct for the passage of fluid;
   at least one fluid inlet and at least one fluid outlet;
   a membrane housed in the duct and configured to be deformed by a magnetic field between a first position of at least partial closure of the duct and a second position of at least partial opening of the duct; and
   means for generating a magnetic field inside the duct to control the deformation of the membrane,
   wherein the membrane is made from a flexible material and contains magnetic particles,
   wherein the membrane is deformed by the magnetic field in such a way that the magnetic particles are aligned parallel to field lines of the magnetic field.

2. The valve as claimed in claim 1, wherein the membrane is fixed to an internal wall of the duct.

3. The valve as claimed in claim 1, wherein said means consist of a winding of at least one electrical wire around a part of the duct housing the membrane.

4. The valve as claimed in claim 3, wherein the winding is configured to generate heat for heating the fluid.

5. A hydraulic connector for a vehicle windshield washer liquid distribution system, comprising: at least one valve as claimed in claim 1.

6. A vehicle windshield washer liquid distribution system comprising at least one valve as claimed in claim 1.

7. A vehicle windshield wiper system comprising a least one wiper; and at least one valve as claimed in claim 1.

8. The wiper system as claimed in claim 7, further comprising: a pump and at least one sprayer manifold connected to the pump by the valve.

9. The wiper system as claimed in claim 8, further comprising: an arm for driving said wiper.

10. The wiper system as claimed in claim 9, wherein the valve is integrated into means for connecting the wiper to the arm for driving said wiper.

11. The wiper system as claimed in claim 9, wherein the at least one sprayer manifold is situated on the arm.

12. The wiper system as claimed in claim 8, wherein the at least one sprayer manifold is situated on the wiper.

13. A system for cleaning a motor vehicle driving assistance device, wherein the device is one of imaging means or electromagnetic detection means, said system comprising at least one fluid distribution valve as claimed in claim 1.

* * * * *